(12) United States Patent
Ratliff et al.

(10) Patent No.: US 7,536,831 B2
(45) Date of Patent: May 26, 2009

(54) ROTATABLE BUILDING

(75) Inventors: Frank W Ratliff, Payson, AZ (US); Albert E Johnstone, III, La Mesa, CA (US); David A. Berg, Henderson, NV (US); Michael L Rogers, Los Angeles, CA (US)

(73) Assignee: 3sixty Technologies, LLC, Henderson, NV (US)

( * ) Notice: Subject to any disclaimer, the term of this patent is extended or adjusted under 35 U.S.C. 154(b) by 110 days.

(21) Appl. No.: 11/421,371

(22) Filed: May 31, 2006

(65) Prior Publication Data

US 2006/0201071 A1    Sep. 14, 2006

Related U.S. Application Data

(63) Continuation-in-part of application No. 09/942,294, filed on Aug. 29, 2001, now Pat. No. 7,107,725, which is a continuation-in-part of application No. 09/687,687, filed on Oct. 13, 2000, now Pat. No. 6,742,308.

(51) Int. Cl.
*E04B 1/346* (2006.01)
*E04H 3/26* (2006.01)
*E04H 1/00* (2006.01)

(52) U.S. Cl. .................. 52/65; 52/7; 52/31; 52/234; 52/236.3

(58) Field of Classification Search ............ 52/65, 52/7, 31, 234, 236.3
See application file for complete search history.

(56) References Cited

U.S. PATENT DOCUMENTS 360,508 A    4/1887    Brown
390,093 A    9/1888    Pauly et al.
407,877 A    7/1889    Rowe (Continued)

FOREIGN PATENT DOCUMENTS

DE    3426708    1/1986

(Continued)

OTHER PUBLICATIONS

++ 646industries.com Article, "Beyond Brilliance: Rotating Apartments," dated Dec. 17, 2004, available: http://www.646industries.com/beyond_b/archives/2004/12/rotating_apartm.html, printed Oct. 1, 2008, 1 page.

(Continued)

*Primary Examiner*—Richard E Chilcot, Jr.
*Assistant Examiner*—Mark R Wendell
(74) *Attorney, Agent, or Firm*—SoCal IP Law Group LLP; Steven C. Sereboff

(57) ABSTRACT

There is disclosed an apparatus having a base, a shaft, a swivel joint assembly and plural stories. The base is fixed relative to the ground. The shaft extends vertically through the apparatus. The shaft is mounted to the base. The swivel joint assembly is mounted in the base coaxially with the shaft. The swivel joint rotatably connects fixed utility lines extending into the base with corresponding utility lines secured within the apparatus. Each of the plural stories defines an enclosed living area and is rotatably supported, at least in part, via the shaft. Each story has a drive mechanism adapted to rotate the story about the shaft at a speed controllable within the story.

29 Claims, 12 Drawing Sheets

U.S. PATENT DOCUMENTS

| | | | |
|---|---|---|---|
| 841,468 A | | 1/1907 | Tilyou |
| 895,176 A | * | 8/1908 | Gaynor ............... 472/136 |
| 2,563,531 A | | 8/1951 | Kirkman |
| 2,701,146 A | | 2/1955 | Warren |
| 2,764,783 A | | 10/1956 | Teller |
| 3,093,869 A | * | 6/1963 | Ranney ............... 52/65 |
| 3,125,189 A | * | 3/1964 | Graham ............... 52/65 |
| 3,156,017 A | * | 11/1964 | Faerber ............... 52/65 |
| 3,246,431 A | * | 4/1966 | Faerber ............... 52/65 |
| 3,299,588 A | * | 1/1967 | Arnold ............... 52/65 |
| 3,388,513 A | * | 6/1968 | Bauer ............... 52/65 |
| 3,398,843 A | * | 8/1968 | Smith ............... 414/242 |
| 3,513,871 A | | 5/1970 | Johnston |
| 3,517,694 A | | 6/1970 | Lieffring |
| 3,599,378 A | | 8/1971 | Kachnic |
| 3,636,975 A | | 1/1972 | Kirkman |
| 3,664,523 A | | 5/1972 | Hagel |
| 3,707,812 A | | 1/1973 | Roessl |
| 3,827,199 A | | 8/1974 | Tax |
| 3,851,663 A | | 12/1974 | Neuko |
| 3,895,473 A | | 7/1975 | Fraser |
| 3,895,495 A | * | 7/1975 | Akazaki et al. ....... 405/200 |
| 3,905,166 A | * | 9/1975 | Kaiser ............... 52/65 |
| 3,910,309 A | | 10/1975 | Kaiser |
| 3,933,400 A | | 1/1976 | Helgeson |
| 4,016,990 A | | 4/1977 | Hodkin et al. |
| 4,065,891 A | | 1/1978 | Burgin |
| 4,234,215 A | | 11/1980 | Wilson |
| 4,250,918 A | | 2/1981 | Tuson |
| 4,262,694 A | | 4/1981 | McConnell |
| 4,318,198 A | | 3/1982 | Drozd |
| 4,323,268 A | | 4/1982 | Wilson |
| 4,353,608 A | | 10/1982 | Massau |
| 4,498,398 A | | 2/1985 | Vallee |
| 4,558,890 A | | 12/1985 | Schartz |
| 4,602,806 A | | 7/1986 | Saliger |
| 4,644,707 A | | 2/1987 | Aubourg |
| 4,726,316 A | | 2/1988 | Bruns |
| 4,750,428 A | | 6/1988 | Hyte |
| 4,759,573 A | | 7/1988 | Delamare |
| 4,817,345 A | | 4/1989 | McGlew |
| 4,877,054 A | | 10/1989 | Walter |
| 4,953,488 A | | 9/1990 | Heidtmann |
| 4,969,300 A | * | 11/1990 | Pope ............... 52/65 |
| 5,016,736 A | * | 5/1991 | Vayda ............... 186/53 |
| 5,113,974 A | * | 5/1992 | Vayda ............... 186/36 |
| 5,179,971 A | | 1/1993 | Jackson |
| 5,205,768 A | | 4/1993 | Pollack |
| 5,653,065 A | * | 8/1997 | McIlwain ............... 52/65 |
| 5,702,130 A | | 12/1997 | Jostein |
| 5,755,160 A | | 5/1998 | Blufordcraving |
| 5,829,941 A | * | 11/1998 | Zamorano Morfin ....... 414/261 |
| 5,918,424 A | | 7/1999 | Rice |
| 5,922,941 A | | 7/1999 | Winkler et al. |
| 5,979,121 A | * | 11/1999 | Bennington ............... 52/65 |
| 6,073,970 A | | 6/2000 | Ott et al. |
| 6,148,568 A | * | 11/2000 | Beasley ............... 52/65 |
| 6,336,751 B1 | | 1/2002 | Shibayama |
| 6,336,781 B1 | | 1/2002 | Doppelmayr et al. |
| 6,401,746 B1 | | 6/2002 | Scott, Jr. |
| 6,402,202 B1 | | 6/2002 | Colombo |
| 6,457,280 B1 | * | 10/2002 | Park ............... 52/65 |
| 6,672,221 B2 | * | 1/2004 | Hadley ............... 104/35 |
| 6,742,308 B1 | * | 6/2004 | Johnstone et al. ....... 52/65 |
| 7,032,353 B2 | * | 4/2006 | Johnstone et al. ....... 52/65 |
| 7,107,725 B2 | * | 9/2006 | Johnstone et al. ....... 52/65 |
| 2002/0045383 A1 | | 4/2002 | Johnstone, III et al. |
| 2002/0129564 A1 | * | 9/2002 | Park ............... 52/64 |
| 2004/0103594 A1 | | 6/2004 | Johnstone, III et al. |
| 2006/0230691 A1 | * | 10/2006 | Fisher ............... 52/65 |

FOREIGN PATENT DOCUMENTS

| | | |
|---|---|---|
| DE | 9016212.9 | 3/1991 |
| DE | 42 40 577 A 1 | 6/1994 |
| FR | 1420219 | 12/1965 |
| FR | 2429956 | 1/1980 |
| FR | 2655075 A1 * | 5/1991 |

OTHER PUBLICATIONS

++ Emporis.com Article, "Stock photography and photos of Suite Vollard," available at http://www.emporis.com/en/il/pc?id=136410&aid=8, printed Oct. 1, 2008, © 2000-2008, 2 pp.
++ RotatingHome.com Article, "Maximize your view with RotatingHome," available at http://www.rotatinghome.com/, printed Oct. 11, 2005, © 2004, 11 pp.
++ Univision.com Article, "Apartamentos giratorios en Brasil," available at http://www.univision.com/content/print.jhtlm?cid=529035&&FilePat . . . , printed Jan. 26, 2006, © 1 page.
++ ISA/US, International Search Report dated Dec. 20, 2007 in regard to International Patent Application Serial No. PCT/US2007/68685, 1 pg.

* cited by examiner

ROTATABLE BUILDING

RELATED APPLICATION INFORMATION

This application is a continuation-in-part of application Ser. No. 09/942,294 filed Aug. 29, 2001, which issued as U.S. Pat. No. 7,107,725, and which is continuation-in-part of application Ser. No. 09/687,687, filed Oct. 13, 2000 now U.S. Pat. No. 6,742,308, the disclosures of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to buildings with rotatable elements.

2. Description of the Related Art

The present invention relates generally to rotatable buildings, and is particularly concerned with a service or utilities supply swivel joint apparatus and method for such a building.

In such buildings, services such as water, gas, sewer and electric are provided in a fixed central portion of the building about which an outer portion rotates.

DETAILED DESCRIPTION

Throughout this description, the embodiments and examples shown should be considered as exemplars, rather than limitations on the apparatus and methods disclosed or claimed.

Description of Systems

Figure 1:
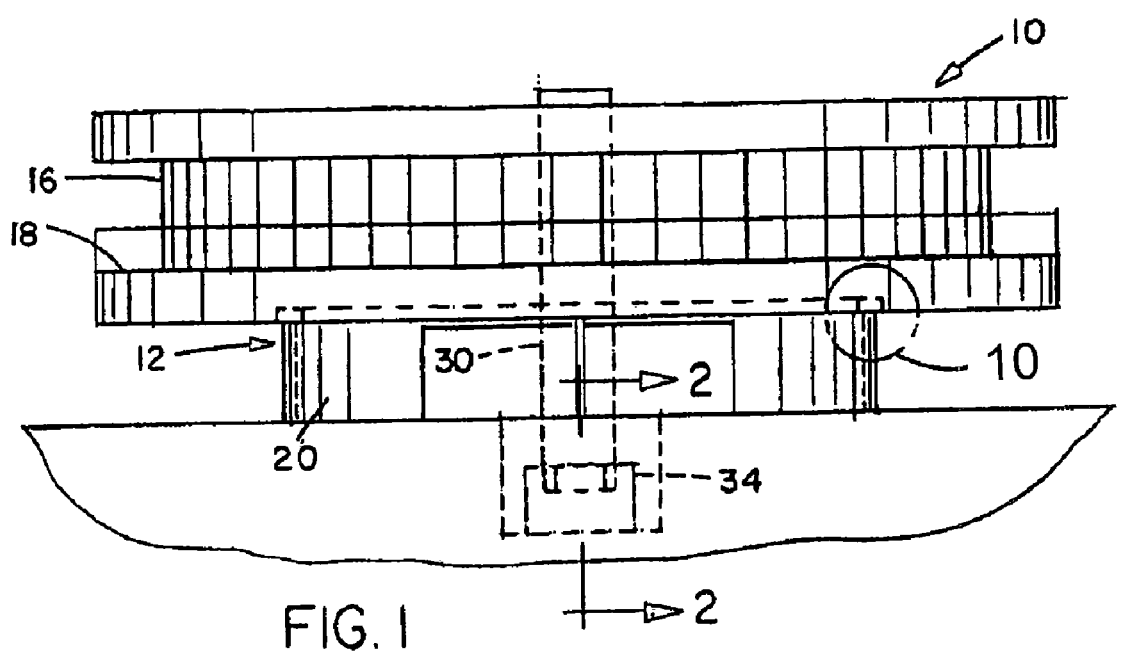
FIG. 1 is a front elevational view of a rotatable building.
Figure 2:
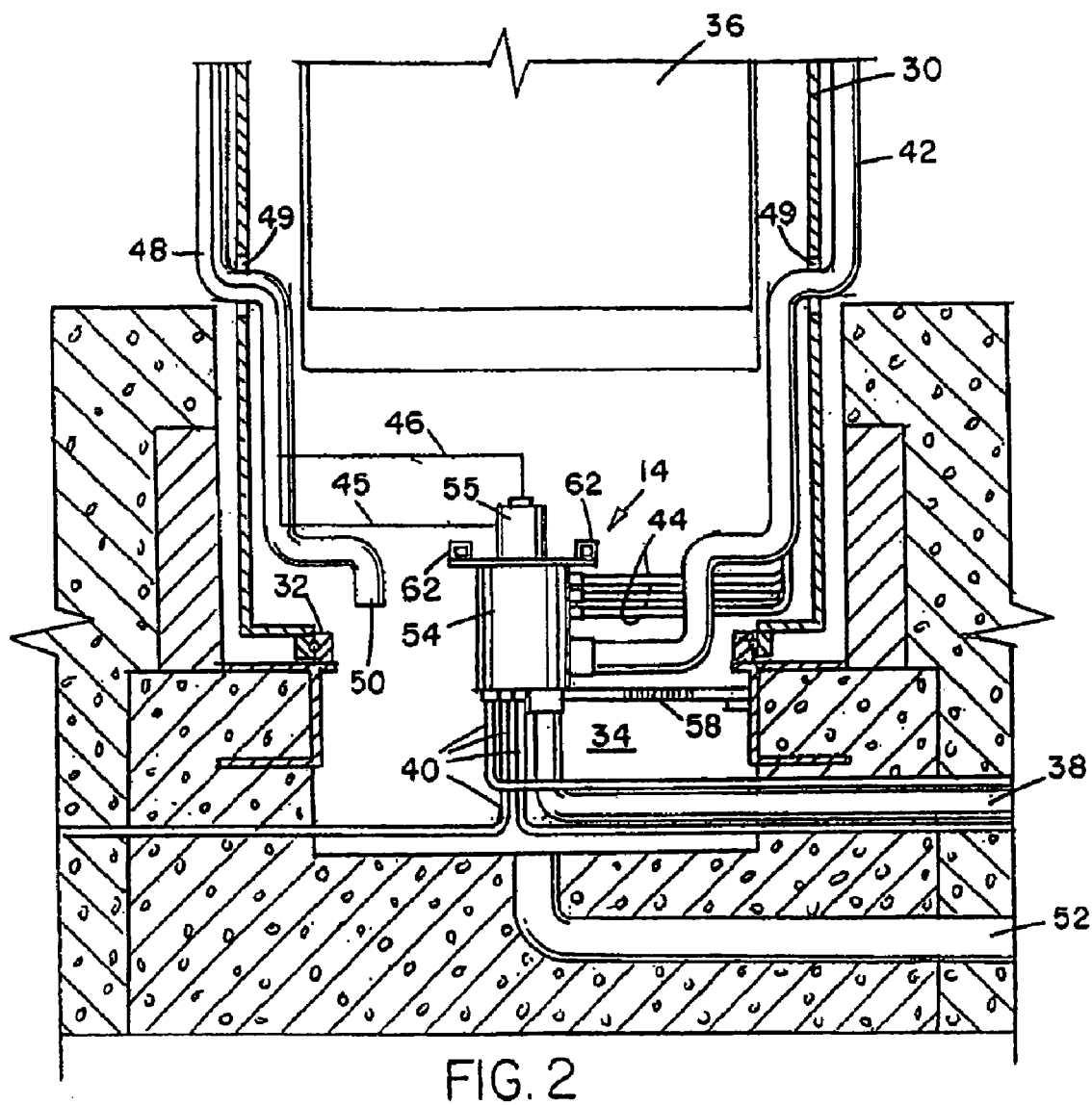
FIG. 2 is a cross-section through a portion of the support base of the building on lines 2-2 of FIG. 1, with some of the utility lines into and out of the building omitted for clarity.
Figure 10:
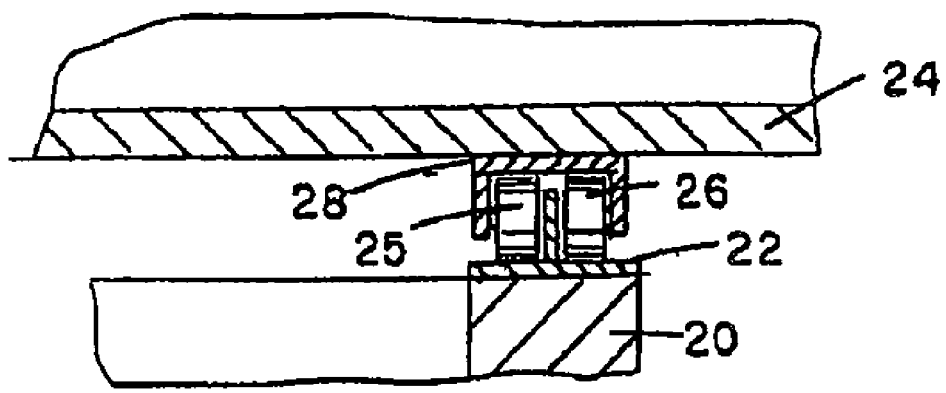
FIG. 10 is a sectional view of the circled area labeled 10 in FIG. 1.

FIG. 1 of the drawings illustrates a rotatable building such as a house or the like which has a rotatable portion or living area 10 rotatably supported on a fixed base 12 as illustrated in FIGS. 10 and 2. A service swivel joint assembly 14 according to a preferred embodiment of the present invention is provided in the fixed base for supplying electrical power and services, water, gas, and other utilities to the rotating structure.

The rotatable building 10 in the illustrated embodiment is circular in shape, although other shapes may be utilized, and has an enclosed central living area 16, which preferably has windows around the entire circumference, surrounded by an annular deck or balcony 18 extending around the entire outer periphery of the building. The fixed base 12 has a cylindrical outer wall 20 with an inverted T rail 22 of steel running around its upper rim, as illustrated in FIG. 10. The floor 24 of the rotating structure has a series of spaced inner and outer bearings 25, 26 which run around the rail and which are mounted in wobble boxes 28 in groups of four. The base 12 provides a garage space for storage of vehicles and the like.

The rotating portion 10 of the building is also rotatably supported at its center via a central elevator shaft 30 which is rotatably supported at its lower end on a bearing assembly 32 in a central swivel chamber or pit 34 which is located below the ground level and centered on the central axis of the building, as indicated in FIGS. 1 and 2. Elevator shaft 30 extends upwardly from the submerged chamber 34 to the top of the building, and an elevator car 36 within the shaft is suitably driven to transport the inhabitants from the garage level to and from the upper stories of the building. The central bearing assembly 32 is of sufficient strength to support the rotating elevator shaft 30. In one example, the shaft 30 had an outer diameter of six feet and a height of 28 feet, and the bearing was a six feet diameter, 1,364,000 lb bearing model A18-60P1B manufactured by Rotek, Inc. of Aurora, Ohio.

Various fixed utility lines such as sewer line 38, and other utility lines 40 such as water, waste water or gray water, gas, electrical power, and electrical services such as telephone, cable, television, computer, and the like, are directed into the chamber 34 for connection to a fixed part of the swivel joint assembly 14. Corresponding sewer 42, other utilities 44, electrical power lines 45, and electrical service lines 46 are connected to rotating parts of the swivel joint assembly at their lower ends, and extend upwardly alongside the elevator shaft 30 for connection to plumbing, gas and electrical fixtures throughout the rotating portion of the building. A drain line 48 extends downwardly from the roof of the building alongside the elevator shaft and back through a window 49 in the shaft within the chamber 34. Line 48 has an outlet end 50 directed downwardly in the pit or chamber 34. A drain outlet 52 is provided in the lower end of the chamber 34 for drainage of water from the roof. It will be understood that the various incoming and outgoing service lines are shown schematically and not in any particular order. Also, in practice, all of the lines can be directed outwardly through a single rectangular opening in the elevator shaft to one side of the shaft, although they are illustrated extending on opposite sides in FIG. 2 for convenience and clarity. The arrangement of the incoming and outgoing lines will be dependent on the position of the building relative to the various adjacent service lines.

The swivel joint assembly 14 will now be described in more detail with reference to FIGS. 2 to 9. The assembly 14 has a lower portion 54 for coupling the gas, sewer and water lines into and out of the rotating structure, and an upper portion 55 for coupling the electrical power and service lines.

Figure 3:
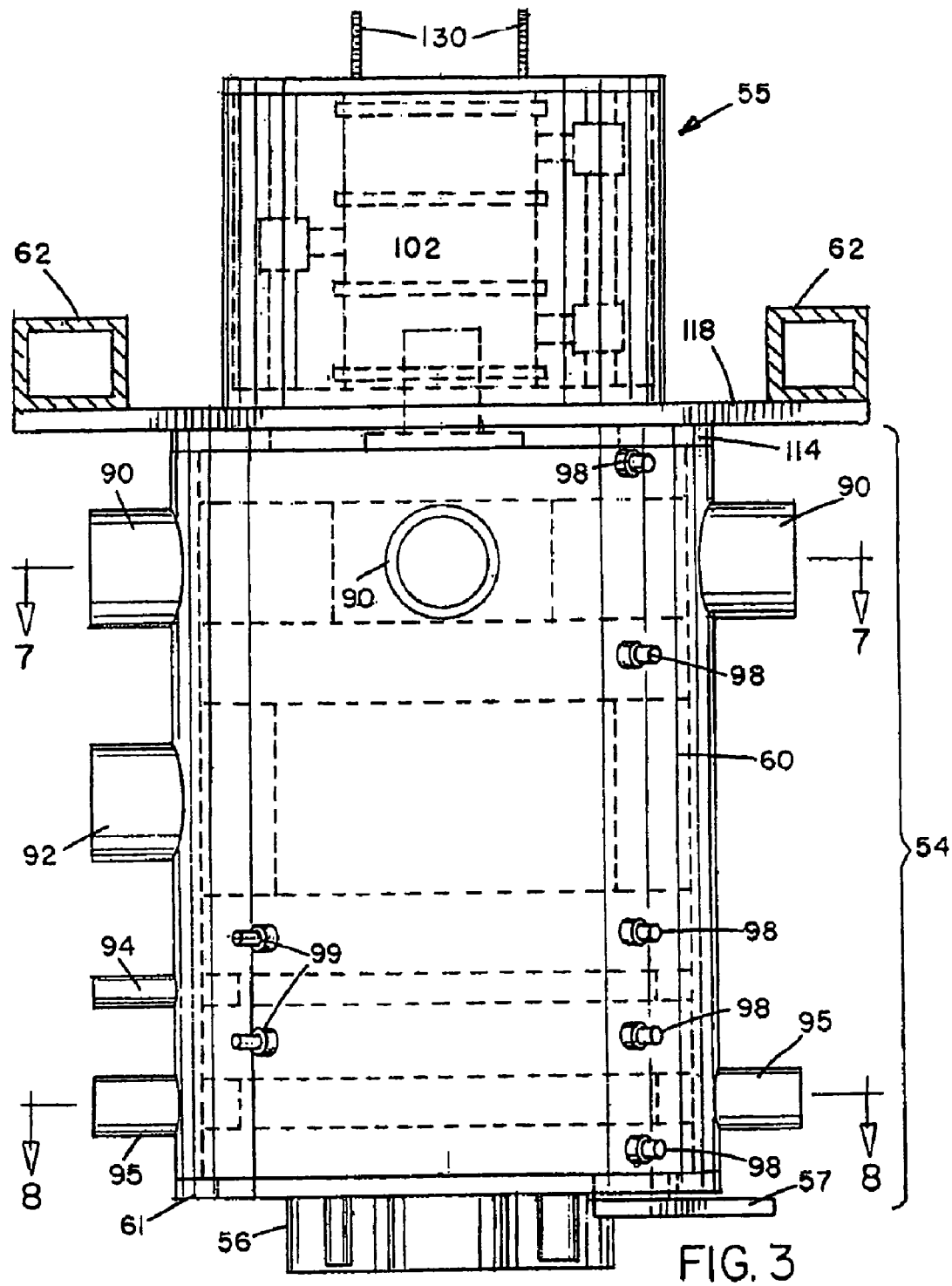
FIG. 3 is front elevational view of a swivel support apparatus.

The lower portion 54 basically comprises an inner fixed spool 56 and an outer swivel casing 60 rotatably mounted on fixed spool 56 as illustrated in FIGS. 3 and 6 to 8. The fixed spool 56 is coupled to the fixed base of the building via a torque bracket or lug 57 connected to torque tie 58 within pit 34, as indicated in FIG. 2. The swivel casing 60 is connected to the rotating portion 10 of the building by supports beams 62 which extend across the top of the casing as illustrated in FIGS. 2 and 3, and are secured at their opposite ends to the rotating shaft 30. The casing 60 is rotatably supported on a fixed brass bearing ring 61 at its lower end, which in turn is secured to torque bracket or lug 57, as indicated in FIG. 3.

The fixed inner spool 56 is illustrated in detail in FIGS. 4 to 8 and has a central through bore 63 and a plurality of outwardly facing, annular chambers 64, 65, 66, and 67 separated by annular rings 68, 69, 70, 71 and 72 at the top and bottom of the spool and between each adjacent pair of chambers. The swivel casing is a cylindrical member which rotates around the inner spool and has a diameter slightly greater than the diameter of the outer rings 68 to 72, so that it forms an outer wall for each of the annular chambers, as best illustrated for chamber 65 in FIG. 6 and chamber 64 in FIG. 7. Ring seals 76 are mounted on each annular ring to project outwardly into rotatable sealing engagement with the inner surface of casing, 60, sealing each of the chambers from the adjacent chambers and the exterior of the swivel joint assembly. One ring seal 76 is mounted on each of the upper and lower rings 68 and 72, while two spaced ring seals 76 are provided on each of the rings 69, 70 and 71 which separate adjacent chambers, for additional security. The seals are of any suitable resilient seal material of sufficient durability and reliability. Suitable seals for use as the ring seals 76 are Z-seals with a nitride or poly-vi lip and a fluorotrel base, as manufactured by Northern American Seals of Fresno, Calif.

Figure 4:
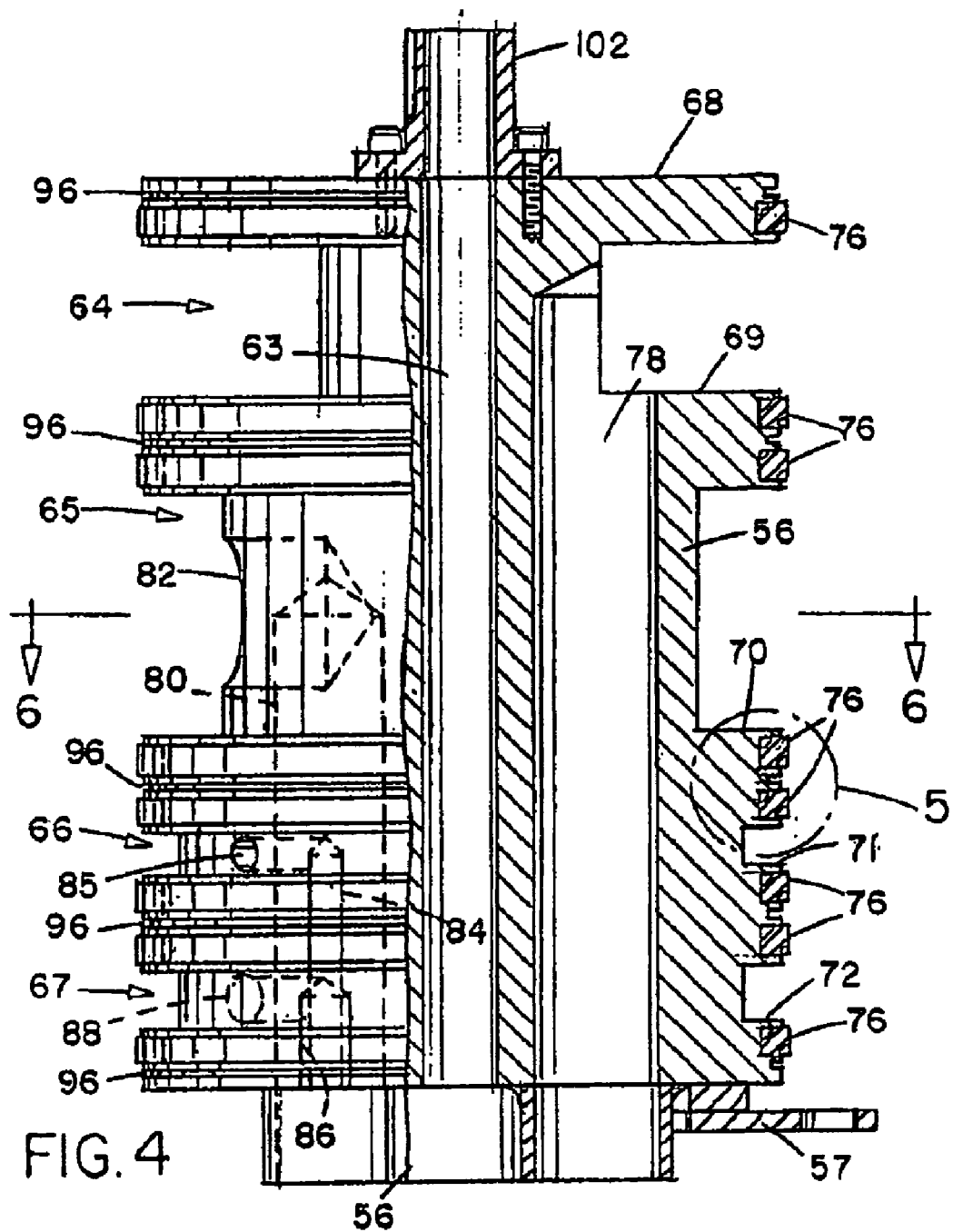
FIG. 4 is a front elevational view, partially in section, of the inner fixed core of a swivel assembly.
Figure 5:
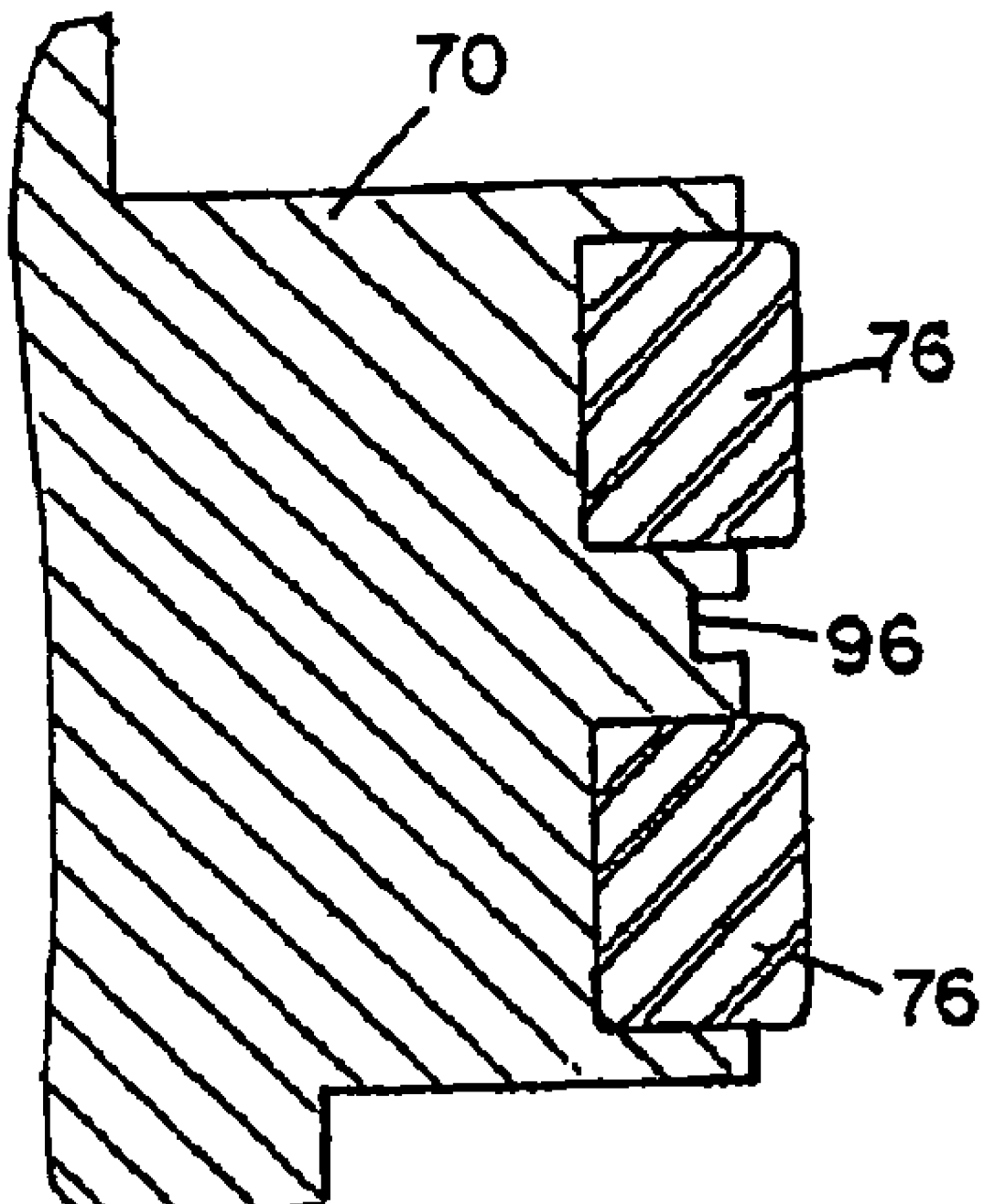
FIG. 5 is an enlarged section of the circled portion of FIG. 4 labeled 5.
Figure 6:
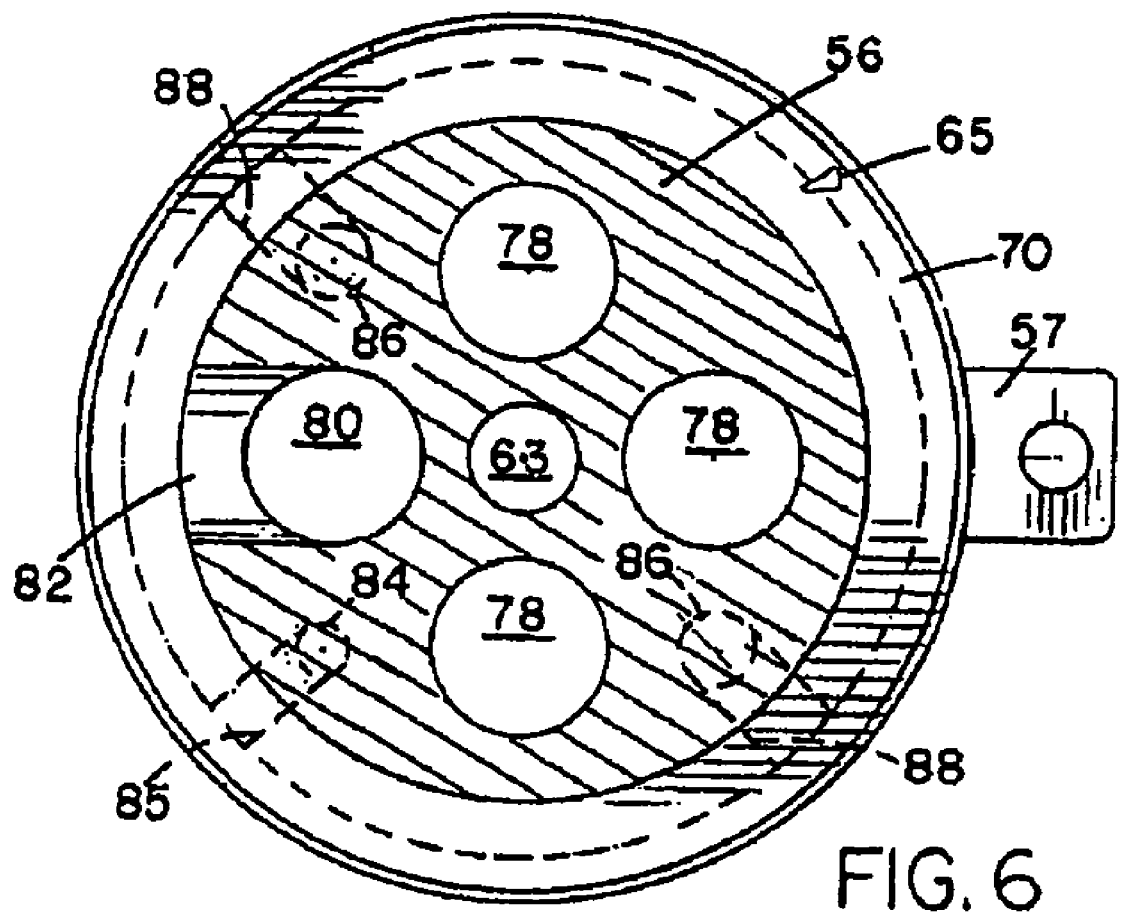
FIG. 6 is a section on the lines 6-6 of FIG. 4.
Figure 7:
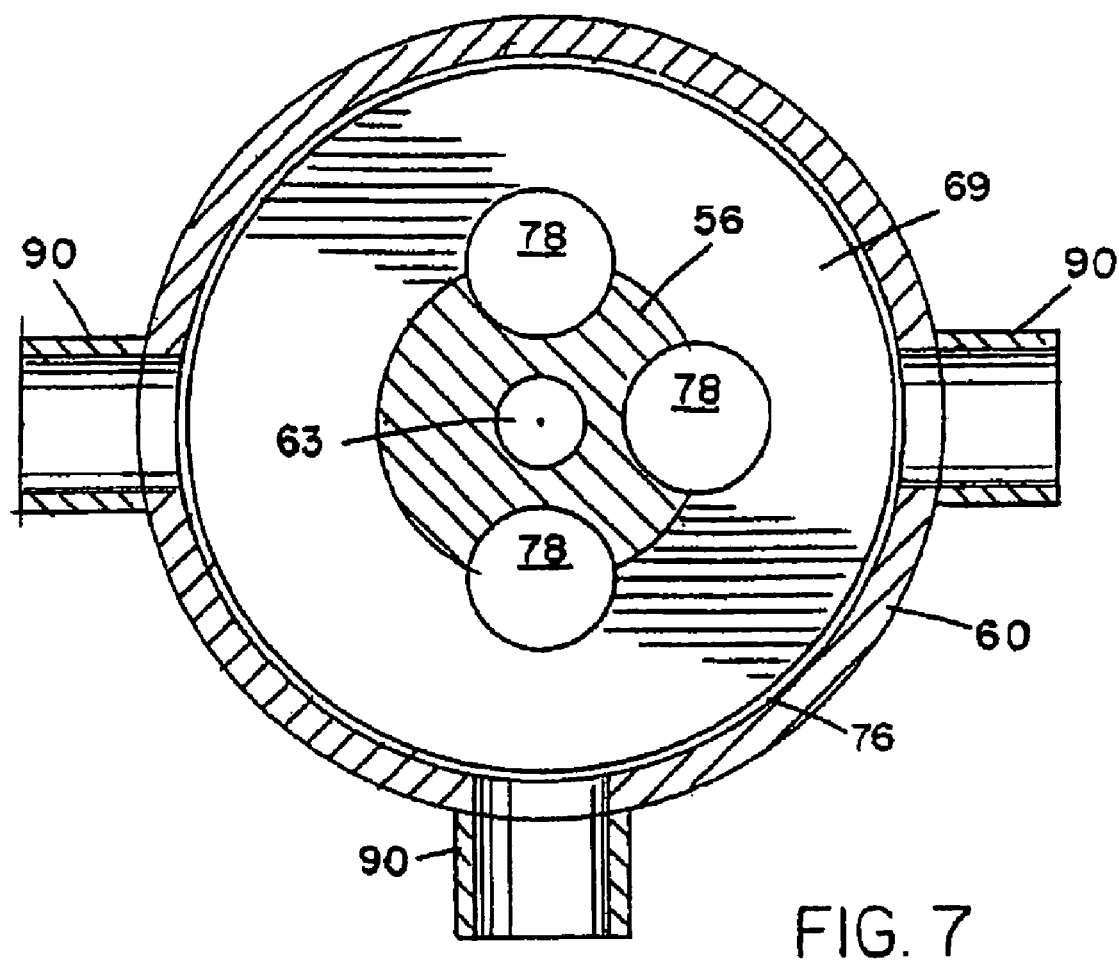
FIG. 7 is a section on the lines 7-7 of FIG. 3.
Figure 8:
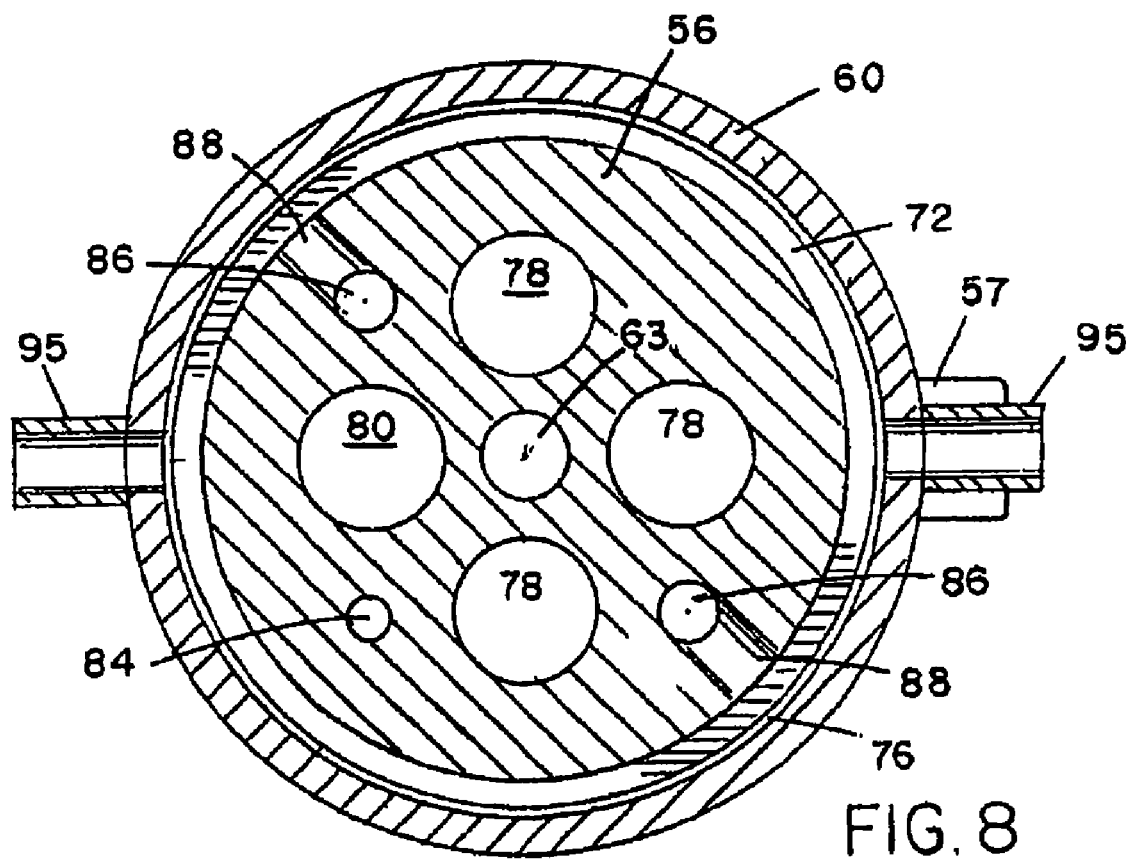
FIG. 8 is a section on the lines 8-8 of FIG. 3.

The annular chambers 64 to 67 are of different sizes, depending on the required fluid capacity. Each chamber is connected to one or more ports extending upwardly from the lower end of the spool through the central portion of the spool and terminating in the respective chamber. The upper, relatively large annular chamber 64 is designated as a sewer chamber, the next chamber 65 is for gray or waste water, the third chamber 66 is for gas, and the fourth chamber 67 is for the clean water supply to the house. As indicated in FIGS. 4, 6 and 7, a series of three ports or bores 78 are connected to the fixed sewer line 38 at the lower end of the spool, and extend upwardly through the spool to terminate in chamber 64. A port or bore 80 of equivalent diameter to ports 78 is connected to a fixed, gray water outlet line 40 and extends upwardly through spool 56 to terminate at an outlet 82 in chamber 65, as indicated in FIGS. 4 and 6. A third bore or port 84 of smaller diameter is connected to a gas line 40 at the lower end of the assembly 14 and extends upwardly through the spool to terminate at an inlet 85 into chamber 66. A pair of ports or bores 86 extend from fixed water lines 40 through the spool to terminate at an inlet 88 into the lowermost or clean water chamber 67, as illustrated in FIGS. 3,4 and 8.

The outer swivel casing forms an outer, rotating cylindrical wall for each of the chambers 64 to 67, and includes various ports for connection to utility lines extending to various fixtures within the rotating part of the building, such as sinks, showers, baths, toilets, gas powered devices and the like. As best illustrated in FIGS. 3 and 7, three ports 90 project radially through the wall of casing 60 and communicate with the sewer chamber 64. A gray water port 92 is spaced beneath one of the ports 90 and communicates with the gray water chamber 65. A small diameter gas port 94 is positioned in the casing beneath port 92 and communicates with gas distribution chamber 66. Finally, a pair of clean water ports 95 are positioned below port 94 and communicate with water chamber 67, as illustrated in FIG. 8. The various sewer and utility lines 42,44, only some of which are shown in FIG. 2 for illustration purposes, are connected to the various ports 90,92,94 and 95 and extend upwardly alongside the elevator shaft 30, exiting away from the shaft at the two or more floor levels for connection to the appropriate fixtures within the living areas of the rotating structure.

Another embodiment of the apparatus includes at least two or more floor levels wherein each floor level is independently supported, at least in part, via a bearing which rotatably secures each floor level to the shaft. In this embodiment, the shaft may be fixed to the base 12, which is in turn fixed to the ground via concrete, rebar or other appropriate structural foundation.

Each of the annular rings or flanges 68 to 72 defining the axial end walls of the various chambers also has a groove or indent 96 on its outer periphery which forms a sensor chamber. The indent 96 is located between the seal rings on the annular flanges 69,70 and 71 between adjacent chambers, and above or below the seal ring 76 on the end flanges 68 and 72, respectively. As illustrated in FIG. 3, a pair of diametrically opposed water sensors 98 are mounted on the outer swivel casing 60 to extend through sealed holes in the casing into the uppermost indent or chamber 96. A pair of diametrically opposed water sensors 98 are also mounted to extend through the casing into the chamber 96 in flange 69. These sensors will detect any leakage of sewer water from the sewer chamber 64. Water sensors 98 also project through the casing into the chambers 96 in flanges 70,71 and 72, as indicated in FIG. 3, to detect any leakage of gray water from chamber 65, or clean water from chamber 67. Gas sensors 99 also extend into the chambers 96 in flanges 70 and 71 at opposite ends of the gas supply chamber 66, so that these chambers have sensors for detecting leakage of either gas or water past the seals 76, as illustrated in FIG. 3.

The utility swivel assembly therefore incorporates multiple sensors for detecting failure of any of the ring seals. Each sensor chamber has at least two sensors for water, and the sensor chambers between gas and water chambers have two water sensors and two gas sensors. This provides redundancy in case of failure of a sensor. There are two annular or ring seals between adjacent chambers, providing further redundancy to reduce the risk of any mixing between the various fluid inputs and outputs to and from the house. The sensor outputs will be connected to a control unit having a computer controller within the house, and will indicate failure of any of the seals. The swivel assembly is very simple in construction and provides easy access for repair or replacement of seals or sensors.

Figure 9:
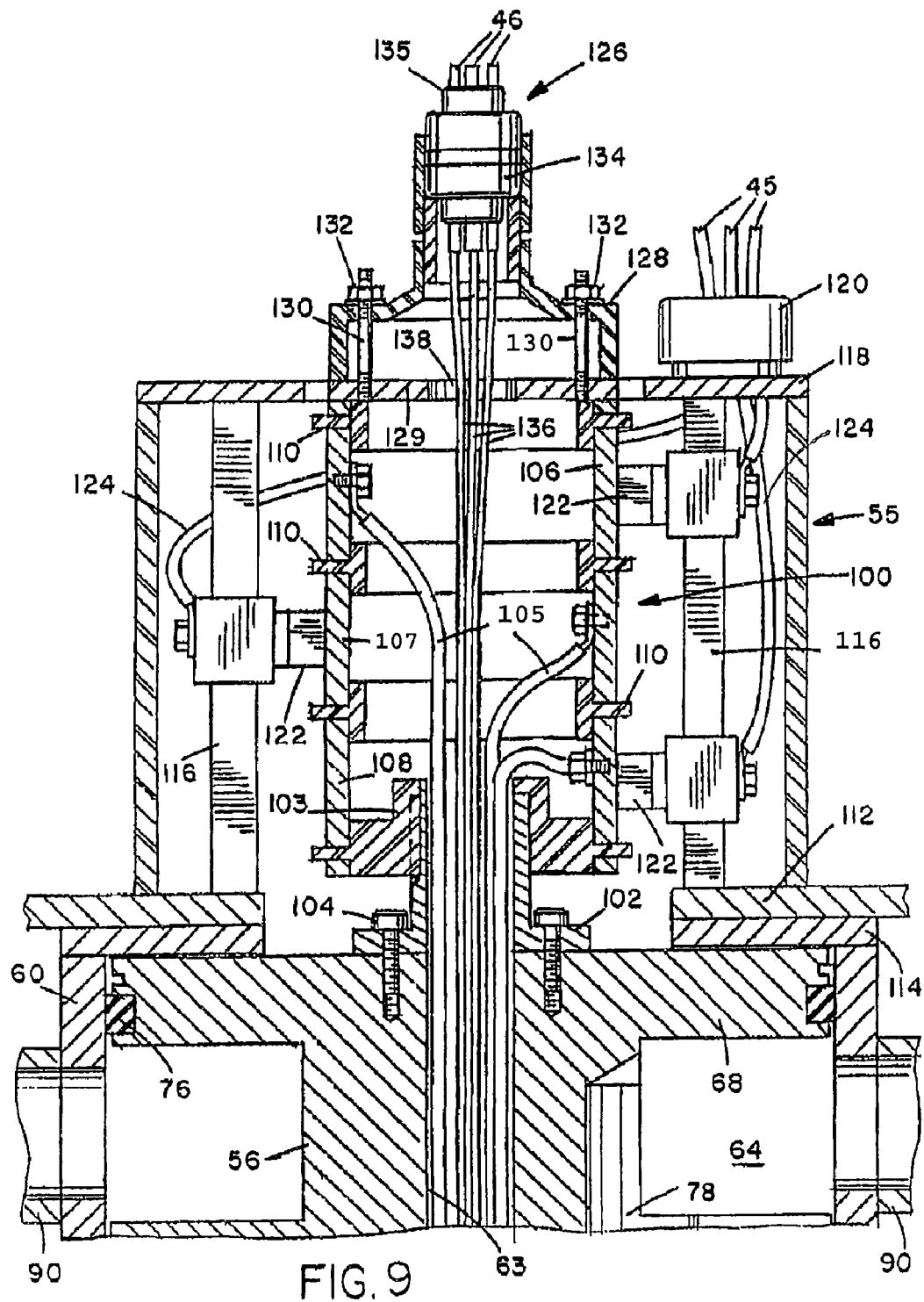
FIG. 9 is a sectional view of the electrical part of the swivel assembly.

The upper or electrical portion 55 of the swivel assembly is mounted on top of the plumbing part 54 of the swivel, as illustrated in FIGS. 3,4 and 9. As best illustrated in FIG. 9, the electrical supply swivel 55 is a three conductor electrical swivel, and includes an inner, fixed power conducting core 100 which is secured to the upper end of the fixed utilities spool 56 via coupling sleeve 102 secured to the upper end of the spool by mounting bolts 104, and an end plug 103 of the core which is keyed to the coupling sleeve 102. Electrical power supply lines 105 extend upwardly through the central through bore 63 in the fixed spool 60, into the conductive core 100, and are secured to three separate conductive rings 106, 107 and 108 in the core 100, which are separated by insulator rings 110.

The electrical swivel has an outer rotating portion having a base plate 112 secured to the top plate 114 of the outer swivel casing 60 of the plumbing swivel, and a series of upwardly projecting posts 116 projecting upwardly from the base plate around a ring spaced outwardly from core 100, and connected to a top plate 118 at the upper end of the swivel. A junction box 120 is mounted on the rotating top plate 118 and the power supply lines 45 extend upwardly from box 120 along the elevator shaft and project outwardly for connection to various electrical sockets and appliances within the rotating portion of the house. Spring loaded brushes 122 project inwardly from the posts 116 to contact the three conductive rings 106, 107, and 108, respectively. A connecting line 124 extends from each brush 122 to the junction box 120, as illustrated in FIG. 9.

An eight conductor, low noise rotating electrical connector 126 is mounted on top of the electrical swivel 55 via a rubber coupling sleeve 128 bolted to the top plate 129 of the fixed part of the electrical swivel via threaded rods 130 and bolts 132. The connector 126 has a lower fixed portion 134 and an upper rotating portion 135 which is connected to the various electrical service lines 46 extending into the house for communication of TV, telephone and computer signals and the like. The fixed portion 134 is coupled to the fixed core 106 of the electrical swivel. Fixed electrical service lines 136 for cable, computer, TV and telephone signals extend upwardly through the central bore 63 in the fixed spool 56, the center of the fixed power conducting core 106 of the electrical swivel, and a central opening 138 in the top plate 118 of the rotating part of the electrical swivel, and are connected to the fixed lower portion 134 of the rotary connector 126.

The electrical swivel 55 may be a standard, off-the-shelf electrical slip ring swivel for providing 240 Volt, 200 Amp electrical supply to the rotating portion of the structure. The upper, rotary electrical connector 126 is preferably an eight wire, mercury filled rotating harness which is very low noise and produces minimal signal interference, such as the Model No. 830 rotating connector available from Mercotac Inc. of Carlsbad, Calif., or equivalents. Similar connectors with a greater or lesser number of conductors or different amperage or voltage may be used if required.

A suitable drive mechanism (not illustrated) will be provided for rotating the rotatable portion 10 of the house in either direction relative to the fixed base 12, with the swivel joint apparatus allowing all of the utility and electrical service lines within the rotating portion of the house to rotate relative to the fixed part of the apparatus 14. In an exemplary embodiment, the drive mechanism used a three horsepower motor with ramp up and ramp down speed control so movement will not be felt by individuals within the moving part of the structure. The movement can be stopped, reversed, or varied as desired via a control panel within the building, and may be manual or voice controlled.

Figure 11:
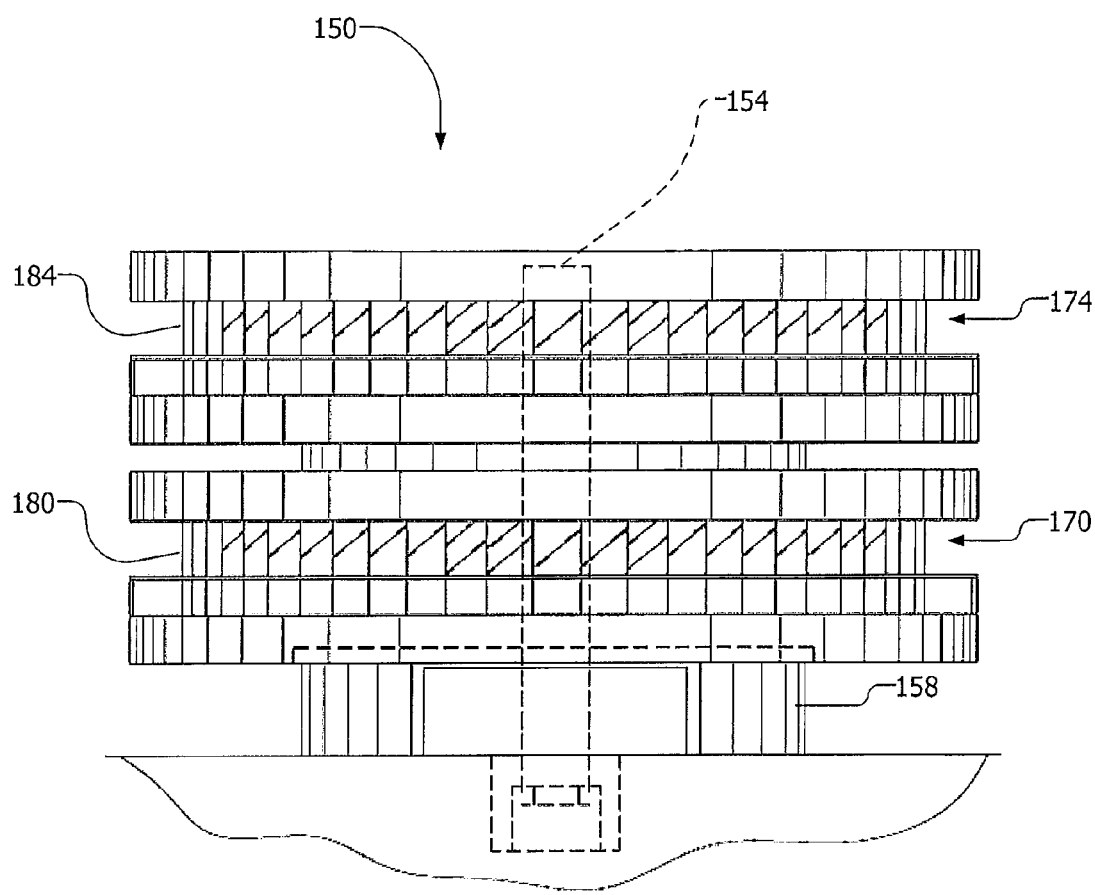
FIG. 11 is a front elevational view of a plural story rotatable building.

As mentioned above, another embodiment of the apparatus may include more than one story. Thus, referring to FIGS. 11 and 12, a two-story variation of the one-story embodiment(s) described in this disclosure is illustrated by the apparatus shown generally at 150. Apparatus 150 may include a shaft 154 which extends vertically through the apparatus wherein the shaft may be mounted on a base 158, which may be fixed relative to the ground. A swivel joint assembly (discussed elsewhere in this disclosure) may be mounted in the base coaxially with the shaft. The swivel joint assembly may rotatably connect fixed utility lines extending into the base 158 with corresponding utility lines secured within apparatus 150. The swivel joint assembly may include a spindle secured to the base, an outer casing rotatably mounted on the spindle and attached to the shaft, and a plurality of sealed chambers defined between the spindle and the outer casing. The base may have chamber extending below ground level and in which the swivel joint assembly may be mounted. Each of the fixed utility lines may be connected to one of the plurality of sealed chambers and each of the fixed utility lines may be connected to a corresponding chamber via the spindle.

A first story 170, defining a first enclosed living area, may be rotatably supported, at least in part, via a first bearing by the shaft 154. A second story 174, defining a second enclosed living area, may also be rotatably supported, at least in part, via a second bearing by the shaft. Each story may include windows 180, 184 defining a circumference of each story, as can be understood from FIG. 11. A first drive mechanism, shown schematically in FIG. 12 at 190, may rotate the first story 170 about the shaft at a speed controllable within the first story at a first control panel 194. And a second drive mechanism 200 may rotate the second story 174 about the shaft at a speed controllable within the second story such as at a second control panel 204. The second drive mechanism may operate independently from the first drive mechanism. The second story may be adapted to rotate about the shaft at a different speed than the first story.

Figure 12:
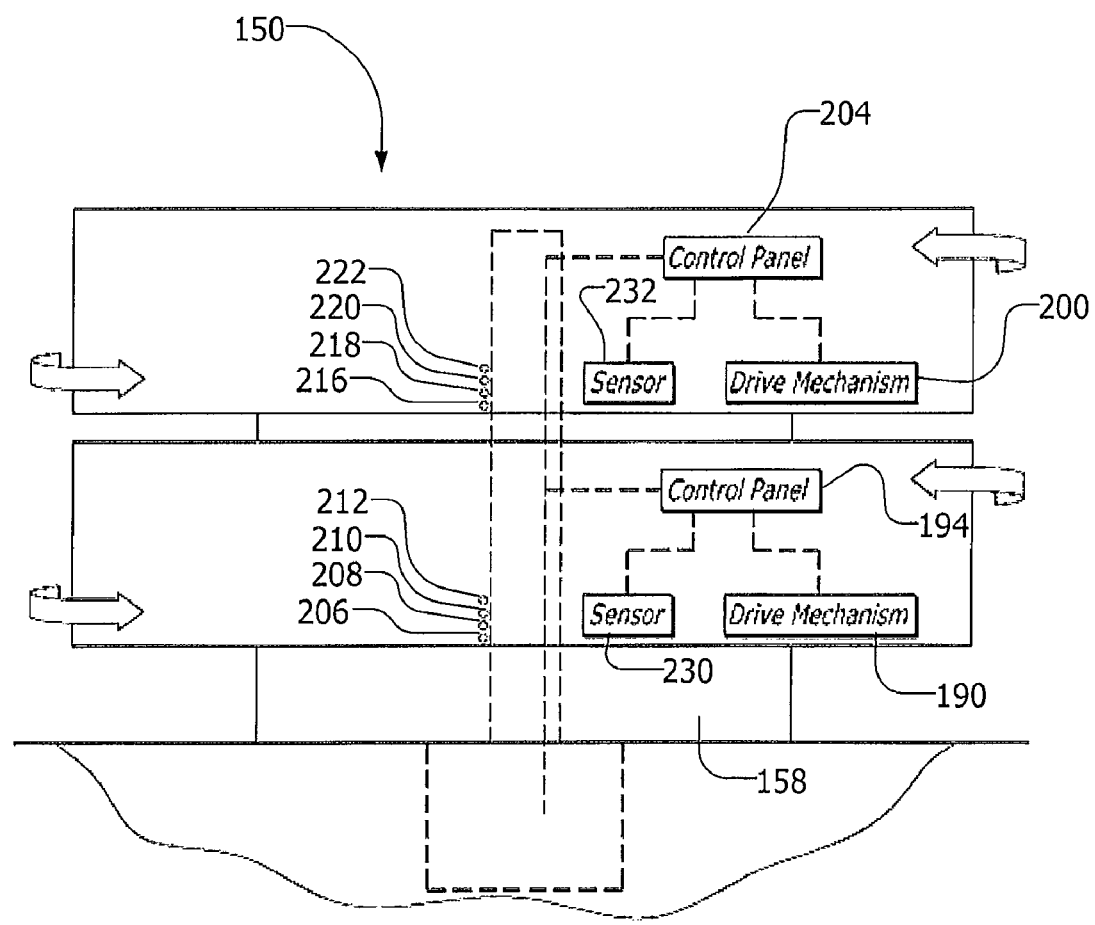
FIG. 12 is a schematic sectional view of the rotatable building of FIG. 11.

Each of the stories may include a plurality of utility ports connected to the corresponding fixed utility lines via the shaft, and the plurality of utility ports may include a natural gas port, a clean water port, a sewer port, and an electrical service port, as depicted respectively and schematically in FIG. 12 at 206, 208, 210, and 212 for the first story 170 at 216, 218, 220 and 222 for the second story. Each story may include a sensor shown schematically at 230 and 232 in FIG. 12 and adapted to detect if water or gas is leaking between one of the plurality of utility ports and one of the corresponding fixed utility lines.

The construction of the two or multi-story variation is interpreted and understood by those skilled in the art with respect to and in conjunction with the one-story embodiment(s) including the swivel joint assembly as disclosed in this patent application disclosure and in the parent applications which issued as U.S. Pat. Nos. 6,742,308 and 7,107,725.

An additional embodiment includes each floor level including a suitable drive mechanism for rotating the living area 16 about the shaft 30 via a bearing. Each suitable drive mechanism may be controlled via a control panel within the individual floor level's living area 16. The movement of each floor relative to the shaft 30 may be controlled independently from the other floors. Thus, one floor may rotate clockwise at 360 degrees per hour, while another floor may synchronously rotate counterclockwise at 360 degrees per day or other speeds.

The swivel joint apparatus 14 of this invention is very simple in construction and allows for easy access and repair. It has built in sensors for detecting any failure in the seals, and the seals, rotary bearings, and other portions of the apparatus are of sufficient strength and durability to potentially last over twenty years without any major service. Unlike prior art swivel joints for rotating buildings, the apparatus 14 will meet most building codes for plumbing and electrical connections.

Closing Comments

The foregoing is merely illustrative and not limiting, having been presented by way of example only. Although examples have been shown and described, it will be apparent to those having ordinary skill in the art that changes, modifications, and/or alterations may be made.

As used herein, "plurality" means two or more.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. An apparatus comprising:
   a shaft extending vertically through the apparatus, the shaft mounted to a base, the base fixed relative to the ground
   a swivel joint assembly mounted in the base coaxially with the shaft, the swivel joint assembly rotatably connecting fixed utility lines extending into the base with corresponding utility lines secured within the apparatus
   a first story defining a first enclosed living area, the first story rotatably supported, at least in part, via the shaft
   a first drive mechanism adapted to rotate the first story about the shaft at a controllable speed
   a second story defining a second enclosed living area, the second story rotatably supported, at least in part, via the shaft
   a second drive mechanism adapted to rotate the second story about the shaft at a controllable speed.

2. The apparatus of claim 1 wherein the second drive mechanism operates independently from the first drive mechanism.

3. The apparatus of claim 1 wherein the second story is adapted to rotate about the shaft at a different speed than the first story.

4. The apparatus of claim 1 wherein each story includes a plurality of utility ports connected to the corresponding fixed utility lines via the shaft.

5. The apparatus of claim 4 wherein the plurality of utility ports include a natural gas port, a clean water port, a sewer port, and an electrical service port.

6. The apparatus of claim 4 wherein each story includes a sensor adapted to detect if water or gas is leaking between one of the plurality of utility ports and one of the corresponding fixed utility lines.

7. The apparatus of claim 1 wherein each story includes windows defining a circumference of each story.

8. The apparatus of claim 1 wherein the base has a chamber extending below ground level, the swivel joint assembly mounted in the chamber.

9. An apparatus comprising:
   a shaft extending vertically through the apparatus, the shaft mounted on a base, the base fixed relative to the ground
   a swivel joint assembly mounted in the base coaxially with the shaft, the swivel joint assembly rotatably connecting fixed utility lines extending into the base with corresponding utility lines secured within apparatus, the swivel joint assembly including
      a spindle secured to the base
      an outer casing rotatably mounted on the spindle and attached to the shaft
      a plurality of sealed chambers defined between the spindle and the outer casing
      wherein each of the fixed utility lines is connected to one of the plurality of sealed chambers and each of the fixed utility lines is connected to a corresponding chamber via the spindle
   a first story defining a first enclosed living area, the first story rotatably supported, at least in part, via the shaft
   a first drive mechanism adapted to rotate the first story about the shaft at a controllable speed
   a second story defining a second enclosed living area, the second story rotatably supported, at least in part, via the shaft
   a second drive mechanism adapted to rotate the second story about the shaft at a controllable speed.

10. The apparatus of claim 9 wherein the second drive mechanism operates independently from the first drive mechanism.

11. The apparatus of claim 9 wherein the second story is adapted to rotate about the shaft at a different speed than the first story.

12. The apparatus of claim 9 wherein each story includes a plurality of utility ports connected to the corresponding fixed utility lines via the shaft.

13. The apparatus of claim 9 wherein the plurality of utility ports includes a natural gas port, a clean water port, a sewer port, and an electrical service port.

14. The apparatus of claim 9 wherein each story includes a sensor adapted to detect if water or gas is leaking between one of the plurality of utility ports and one of the corresponding fixed utility lines.

15. The apparatus of claim 9 wherein each story includes windows defining a circumference of each story.

16. The apparatus of claim 9 wherein the base has a chamber extending below ground level, the swivel joint assembly mounted in the chamber.

17. An apparatus comprising:
   a shaft extending vertically through the apparatus, the shaft mounted to a base, the base fixed relative to the ground
   a swivel joint assembly rotatably connecting fixed utility lines, the fixed utility lines extending into the base, with corresponding utility lines secured within the shaft
   a first story defining a first enclosed living area, the first story rotatably supported, at least in part, via a first bearing by the shaft
   a first drive mechanism adapted to rotate the first story about the shaft at a controllable speed
   a second story defining a second enclosed living area, the second story rotatably supported, at least in part, via a second bearing by the shaft
   a second drive mechanism adapted to rotate the second story about the shaft at a controllable speed.

18. The apparatus of claim 17 wherein the second drive mechanism operates independently from the first drive mechanism.

19. The apparatus of claim 17 wherein the second story is adapted to rotate about the shaft at a different speed than the first story.

20. The apparatus of claim 17 wherein each story includes a plurality of utility ports connected to the corresponding fixed utility lines via the shaft.

21. The apparatus of claim 1 wherein the first drive mechanism is adapted to rotate the first story about the shaft at a speed controllable within the first story.

22. The apparatus of claim 1 wherein the second drive mechanism is adapted to rotate the second story about the shaft at a speed controllable within the second story.

23. The apparatus of claim 1 wherein the first drive mechanism is adapted to rotate the first story about the shaft at a speed controllable within the first story and the second drive mechanism is adapted to rotate the second story about the shaft at a speed controllable within the second story.

24. The apparatus of claim 9 wherein the first drive mechanism is adapted to rotate the first story about the shaft at a speed controllable within the first story.

25. The apparatus of claim 9 wherein the second drive mechanism is adapted to rotate the second story about the shaft at a speed controllable within the second story.

26. The apparatus of claim 9 wherein the first drive mechanism is adapted to rotate the first story about the shaft at a speed controllable within the first story and the second drive mechanism is adapted to rotate the second story about the shaft at a speed controllable within the second story.

27. The apparatus of claim 17 wherein the first drive mechanism is adapted to rotate the first story about the shaft at a speed controllable within the first story.

28. The apparatus of claim 17 wherein the second drive mechanism is adapted to rotate the second story about the shaft at a speed controllable within the second story.

29. The apparatus of claim 17 wherein the first drive mechanism is adapted to rotate the first story about the shaft at a speed controllable within the first story and the second drive mechanism is adapted to rotate the second story about the shaft at a speed controllable within the second story.

* * * * *